US009443101B2

(12) United States Patent
Jacquin

(10) Patent No.: US 9,443,101 B2
(45) Date of Patent: Sep. 13, 2016

(54) LOW-COST SPECIFICATION AND ENFORCEMENT OF A PRIVACY-BY-CONSENT-POLICY FOR ONLINE SERVICES

(71) Applicant: Xerox Corporation, Norwalk, CT (US)

(72) Inventor: Thierry Jacquin, Saint-Martin d'Uriage (FR)

(73) Assignee: XEROX CORPORATION, Norwalk, CT (US)

( * ) Notice: Subject to any disclaimer, the term of this patent is extended or adjusted under 35 U.S.C. 154(b) by 191 days.

(21) Appl. No.: 14/202,477

(22) Filed: Mar. 10, 2014

(65) Prior Publication Data

US 2015/0254456 A1 Sep. 10, 2015

(51) Int. Cl.
*G06F 21/62* (2013.01)

(52) U.S. Cl.
CPC .................................. *G06F 21/6245* (2013.01)

(58) Field of Classification Search
CPC ............................ G06F 21/54; G06F 21/6245
See application file for complete search history.

(56) References Cited

U.S. PATENT DOCUMENTS 7,076,558 B1 * 7/2006 Dunn .................. G06F 21/6218 709/225
7,574,698 B2 * 8/2009 Kumar .................... G06F 8/316 709/227
7,610,391 B2 * 10/2009 Dunn .................. G06F 21/6218 709/229
7,912,971 B1 * 3/2011 Dunn .................... H04L 63/102 709/203
8,726,378 B2 * 5/2014 de Oliveira ............. G06F 21/52 713/168
2006/0288106 A1 * 12/2006 Kumar .................... G06F 8/316 709/227

OTHER PUBLICATIONS

Bostrom, Gustav; Database encryption as an Aspect; 2004; Retrieved from the Internet <URL: http://aosd.net/workshops/aosdsec/2004/AOSDSEC04_Gustav_Bostrom.pdf>; pp. 1-6 as printed.*
APEC Secretariat. "APEC Privacy Framework" ISBN 981-05-4471-5,, pp. 1-40, Retrieved from http://www.apec.org/Groups/Committee-on-Trade-and-Investment/~/media/Files/Groups/ECSG/05_ecsg_privacyframwk.ashx on Nov. 13, 2013.
Atrey, P. "A Secret Sharing based Privacy Enforcement Mechanism for Untrusted Social Networking Operators" MiFor'11, Nov. 29, 2011, pp. 13-18.
Casassa Mont, et al. "Privacy Policy Enforcement in Enterprises with Identity Management Solutions" PST 2006, pp. 1-12 (2006).
(Continued)

*Primary Examiner* — Saleh Najjar
*Assistant Examiner* — Louis Teng
(74) *Attorney, Agent, or Firm* — Fay Sharpe LLP

(57) ABSTRACT

A system and method for implementing a privacy policy in an application to be run are provided. Definitions are received for a set of fields. At least one of the fields is designated as sensitive by a default privacy policy. A user is provided with a consent editor whereby the user can consent to relaxing the default privacy policy for at least one of the sensitive fields. A consent privacy rule is generated based on the received consent. A mapping aspect is provided which identifies joins at which code of the application is to be augmented by calling a minimization service to apply the default privacy policy by generating a minimized value of data in each of the designated sensitive fields used by the application unless there is a generated consent privacy rule which authorizes relaxation of the default privacy policy for the user's data in a respective sensitive field.

20 Claims, 9 Drawing Sheets

(56) References Cited

OTHER PUBLICATIONS

"Consumer Data Privacy in a Networked World: A Framework for protecting privacy and promoting innovation in the global digital economy" , pp. 1-62, The White House, Feb. 2012.
Kifer, et al. "A Rigorous and customizable framework for privacy" Proc. 31st symposium on Principles of Database systems (PODS), pp. 77-88 (2012).
Lomas, N. "US Government Still Learning on Europe to Dilute Data protection Reform Proposals" TechCrunch, Jan. 18, 2013, Retrieved from http://techcrunch.com/2013/01/18/us-government-still-leaning-on-europe-to-dilute-data-protection-reform-proposals/ on Nov. 13, 2013, pp. 1-4.
OECD Privacy Principles, pp. 1-5, Retrieved from http://oecdprivacy.org on Nov. 13, 2013.
U.S. Appl. No. 14/141,548, filed Dec. 27, 2013, Jacquin.
"Proposal for a Regulation of the European Parliament and of the Council on the Protection of Individuals with regards to the Processing of Personal Data and on the Free Movement of Such data" European Commission, pp. 1-119 (2012).
Schwartz, P. "The EU-U.S. Privacy Collision: a turn to institutions and procedures" Harv. L. Rev. 126, pp. 1966-2139 (2013).
Simao, et al. "Jano- Specification and Enforcement of Location Privacy in Mobile and Pervasive Environments" M-MPAC 2010, pp. 1-8 (2010).

* cited by examiner

```
boolean allowed = false;
boolean rejectedPurposeEncountered = false;
resp.setStatus(ExpansionStatus.REJECTED);
TransparencyLevel grantedLevel = TransparencyLevel. TRANSPARENT;
while (purposesIterator.hasNext( ) && !rejectedPurposeEncountered) {
    p = purposesIterator.next( );
    if (p.isActive( ) ) {
        rejectedPurposeEncountered = true;
        allowanceTracking += "checking purpose :" + p.getName( ) + " \n";
        iterator<ExpansionRule> rulesIterator = selectedRules.iterator ( );
        while (rulesIterator.hasNext ( ) ) {
            ExpansionRule rule = rulesIterator.next ( );
            if ( ! rule.getGrantedPurpose( ).equals(p.getName( ) ) ) {
                continue;
            }
            Iterator<Role> rolesIterator = context.getCurrentRoles( ) .iterator ( );
            while (rulesIterator.hasNext ( ) ) {
                Role r = rolesIterator.next ( );
                if ( containedRole(rule.getGrantedRoles( ), r.getName( ) ) ) && (r.isActive( ) ) ) {
                    rejectedPurposeEncountered = false;
                    allowed = true;
                    grantedLevel = fuzziestOf (grantedLevel, rule.getGrantedTransparency( ) ) );
                    allowanceTracking += " [granted by rule ' " + rule.getName( ) + " ' for role ' " + r.getName( ) + " '] ";
                    break;
                }
            }
        }
    }
}
if (rejectedPurposeEncountered) {
        resp.setMessage(unallowedPurposeResponse(context, p) );
    return resp;
}
// if managed to leave the loop, expansion is granted
// request.getResponse( ).setStatus (ExpansionStatus.GRANTED);
// request.getResponse( ).setMessage (allowanceTracking);
resp.setMessage(allowanceTracking);
resp.setStatus(ExpansionStatus.GRANTED););
resp.setGrantedTransparency(grantedLevel);
return resp;
```

FIG. 6

```
Purpose:
        "Purpose" name=ID '{' points+=PurposePoint+ '}'
        ("description:" description=STRING)?
        ;


PurposePoint:
        name=ID
        "takePoint" takePurpose=Joincut
        ("leavePoint" leavePurpose=Joincut)?
        ;

RoleEnabler :
        "Enabler:" name=ID nativeClass=[types::JvmType | FQN] fieldName=[types::JvmFeature];

// roles of 'specific' type can be used e.g. to recognize child users, based on connections hours or any
identification parameter
Role:
        "Role" name=ID "of type" type=(StdRoles)
        "enabled_by" enabler=[RoleEnabler]
        "given to values:" values+=STRING*
        ("description:" description=STRING)?;

enum StdRoles :
 Admin | User | Specific;

Joincut :
        name=ID "method:" nativeClass=[types::JvmType|FQN] methodName=[types::JvmOperation];
```

FIG. 8

```
UserPolicy:
        "-- Privacy policy:" name=ID "for\n\t\trecord:" record=[gdpf::PersonalRecord]
        ((expands+=ExpandCondition)+
         ("\t\t\t(resilience after:" resilience = Duration ")\n")?
         ("\t\t\t(enforcement node:" enforceNode = [Node | FQNV]")\n")?
         ("\t\t\t(decision node:" decisionNode = [Node | FQNV]")\n")?  )?
         ("minimization/expansion service:" meService=[UserMEService | FQNV])?
         "--\n\n";

ExpandCondition :
        "- field\n\t\t\t(many fields mean OR condition)" (fields+=[gdpf::PrivateField])+
        "granted\n\t\t\tfor role" (roles+=[gdpf::Role])+ "(many roles mean AND
        condition)\n\t\t\t WHEN processing the following purpose:" purpose=[gdpf::Purpose]
        ;

Duration :
        value=INT unit=TimeUnits;
enum TimeUnits :
        hour | day | week | month | year;
```

FIG. 9

LOW-COST SPECIFICATION AND ENFORCEMENT OF A PRIVACY-BY-CONSENT-POLICY FOR ONLINE SERVICES

BACKGROUND

The exemplary embodiment relates to a system and method for maintaining the privacy of personal information and finds particular application in connection with online services.

Most online (webserver) applications are not built to ensure protection of personal information. Several regulatory bodies, for example the European Union, are drafting regulations to require online service providers to ask users for the users' explicit consent for use of the users' information. See, for example, "Proposal for a Regulation of the European Parliament and of the Council on the Protection of Individuals with regard to the Processing of Personal Data and on the Free Movement of Such Data," European Commission (Jan. 25, 2012).

The privacy-by-design approach is a generic engineering principle stating, when applied to development of online services, that the protection of private data is to be considered as a feature from its initial design to implementation. In particular, the proposed EU regulation requires assuming that, when the privacy feature is not considered, data protection must be guaranteed at the most restrictive requirement possible. i.e., there should be no use of the data. This requirement is known as privacy by default. In other words, every record of the application containing information related to a person is considered as private and cannot be communicated or used without explicit authorization of the owner of the data. This extreme requirement makes it difficult to conduct existing online businesses since the existing software infrastructure often has not been developed with privacy guarantees in place. Additionally, privacy-by-default may not be desired by some users who want to allow some data to be used. Privacy-by-consent allows users to select which private data to be disclosed.

A method and system are described which address the problems of integrating privacy requirements into an existing application.

INCORPORATION BY REFERENCE

The following reference, the disclosure of which is incorporated herein in its entirety by reference, is mentioned:

U.S. application Ser. No. 14/141,548, filed Dec. 27, 2013, entitled SYSTEM AND METHOD FOR SPECIFICATION AND ENFORCEMENT OF A PRIVACY POLICY IN ONLINE SERVICES, by Thierry Jacquin.

BRIEF DESCRIPTION

In accordance with one aspect of the exemplary embodiment, a method for implementing a privacy policy includes, for an application to be run, receiving definitions for a set of classes of record and for each of the record classes, a definition of at least one field, wherein at least one of the fields is designated as a sensitive field by a default privacy policy. Provision is made for a user to consent to relaxing the default privacy policy for at least one of the sensitive fields. The user's consent to relaxing the default privacy policy for at least one of the sensitive fields, with respect to the user's data in the respective sensitive field, is received. A consent privacy rule is generated, based on the received consent for the at least one of the sensitive fields. A mapping aspect is provided which is configured to be deployed when the application is run. The mapping aspect identifies joins at which code of the application is to be augmented to relax the default privacy policy for the user's data in a respective sensitive field for which a minimized value is generated under the default privacy policy, by calling a minimization service to apply a level of transparency to the data in the at least one sensitive field, as authorized by the generated consent privacy rule.

One or more of the steps of the method may be implemented by a computer processor.

In accordance with another aspect of the exemplary embodiment, a system for implementing a privacy policy includes memory which receives definitions for a set of classes of records and for each of the record classes, a definition of at least one field. At least one of the fields is designated as a sensitive field by a default privacy policy. A user interface generator provides a consent editor to a user for the user to consent to relaxing the default privacy policy, with respect to the user's data, for at least one of the sensitive fields. A mapping aspect is configured to be deployed when the application is run, the mapping aspect identifying joins at which code of the application is to be augmented by calling a minimization service to apply the default privacy policy by generating a minimized value of data in each of the designated sensitive fields used by the application in the absence of a user's consent which relaxes the default privacy policy for the user's data in one of the sensitive fields. A processor implements the user interface generator and mapping aspect.

In accordance with another aspect of the exemplary embodiment, a method for implementing a privacy policy includes receiving code minimizing at least one sensitive field located in a records manager. A user selection to consent to provide access to data of the minimized sensitive field to a service provider is received and the code is modified to provide the service provided with access to the user's data for the minimized sensitive field.

One or more of the steps of the method may be implemented by a computer processor.

BRIEF DESCRIPTION OF THE DRAWINGS

FIG. 6 illustrates an example decision algorithm for implementing a privacy policy;

FIG. 8 illustrates example code for modifying a Generic Digital Privacy Framework specification to reflect the user's consent; and FIG. 9 illustrates an example user policy grammar rule.

DETAILED DESCRIPTION

Figure 1:
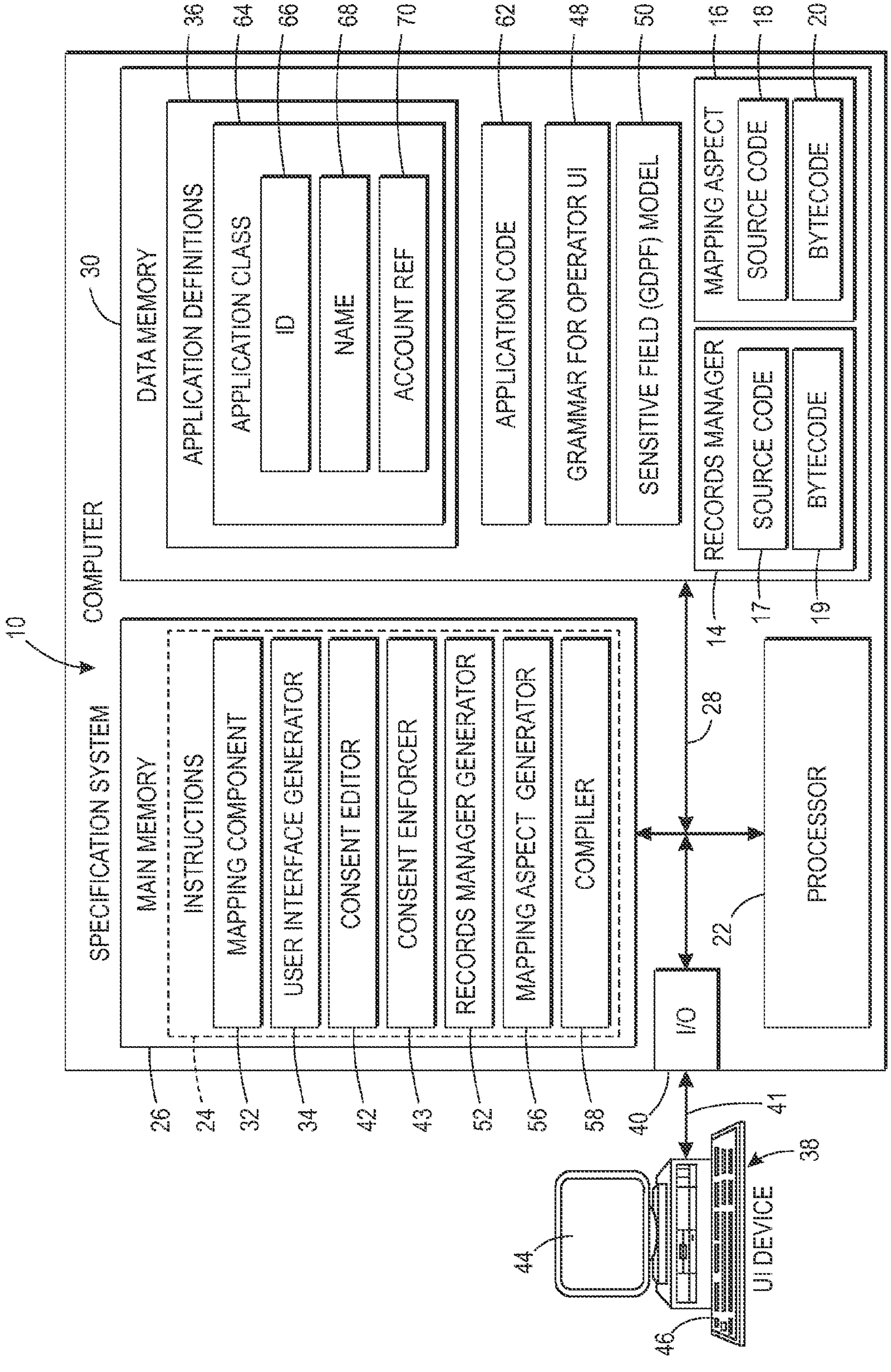
FIG. 1 is a functional block diagram of a code generation system in accordance with one aspect of the exemplary embodiment.

The exemplary embodiment relates to a method and apparatus for modifying an existing application to provide privacy protection by minimizing access to data in a set of sensitive record classes, each record in a sensitive class including at least one field which is designated as a sensitive field, e.g., by minimizing the visibility of data at inception time, and delegating the storage of the full visible data to an external dedicated minimization service. The exemplary system and method allows an implemented privacy-by-default policy to be relaxed when consent is received from the data owner.

By "relaxed," it is meant that the minimized value may be expanded to provide at least partial visibility to the data, when the owner has consented to a greater visibility to the data than the default level provided under privacy-by-default, under the specific access context for which such consent has been granted (purpose and role). Accordingly, in the exemplary embodiment, the privacy-by-default policy is implemented when setting values of sensitive fields, while privacy-by-consent rules are implemented when an application seeks to obtain values from such sensitive fields for the sake of applicative logic.

Above-mentioned U.S. application Ser. No. 14/141,548, incorporated by reference herein, discloses a system in which the privacy-by-consent protection can be implemented. The Ser. No. 14/141,548 application provides a method for identifying and receiving a selection of one or more record classes and corresponding fields which contain private information. The method is particularly suited to implementation in languages which allow additional code (e.g., as bytecode) to be added to an application after compilation using, for example, aspect programming joins. Such languages include Java and C#. The system allows a human operator familiar with the system to select a set of record classes as sensitive and, for each selected class, also to select which fields (or member variables) of the records in each of the selected record classes are sensitive fields. A records manager is generated which controls access to the information in the designated sensitive fields of the records which are in the designated sensitive record classes. Access to a constructor of the sensitive class and "set" function of the fields can be controlled using aspect programming joins.

An exemplary privacy-by-default method as described in application Ser. No. 14/141,548 proceeds in two stages. The first stage includes, for records of an existing application, specifying one or more record classes that are sensitive record classes (or types), each record class including one or more of the records. Additionally, for each of the specified sensitive classes, the method includes specifying which fields of those records that are in the sensitive record class are sensitive (contain private data). The sensitive record classes and fields are modeled and a records manager is generated which is configured to delegate the management of the data in the sensitive fields to a minimization service which is responsible for storing the particular value separately from the other data of the application and minimizing the data in the fields at a level of fuzziness required by the model for the applicative usage. In the second stage, the records manager is run with the existing code of the application.

The exemplary privacy-by-consent method adapts the privacy-by-default method described in the Ser. No. 14/141,548 application by providing an owner of the private data in the sensitive fields of a record (referred to as a "user") to consent to some or all of the user's private data being made accessible to the application using the data, thus creating a consent privacy policy in which the default privacy policy is relaxed in at least one of: the fields which are considered private, the purposes for which they are considered private, and the extent to which they are minimized. In the exemplary embodiment, the user is provided with a consent editor which allows the user to explicitly consent to the access to a portion of the private data by selection of those sensitive classes and fields that are to be made accessible and the level of accessibility. Since the names of classes and fields are not always readily understood, a language and a vocabulary are used to convey to the user the type of data that is covered by the user's selections. Explicit consent means that the user does not necessarily provide a global consent but can specify, for each sensitive field, in which contexts an application using the data is granted the ability to expand the field previously minimized by the privacy-by-default (default privacy) policy, and to what extent.

Then, when an application which seeks to make use of the data is run, on each call to a 'getField( )' operation which seeks access to the data from a particular field of a record, the data is made available, given the following conditions:

1. The purpose of the getField access is known (in the application, the context indicates the active roles at run-time);

2. A mapper (mapping aspect) is able to attach a consent to the record (given the record owner, find the consent given for this field);

3. The consent grants a greater visibility to the data than the default one, under the specific access context (purpose and role);

4. The minimization service that applied the privacy-by-default in the past is accessible and now becomes a minimization/expansion service when it is requested to provide the expansion (up to the granted visibility).

The exemplary method establishes a reasonable tradeoff between an online services provider's economic constraints and the data protection required by a privacy policy that is set by the service provider and/or by a regulatory body. It allows retrofitting privacy-by-consent into an existing application with minimal development.

Figure 2:
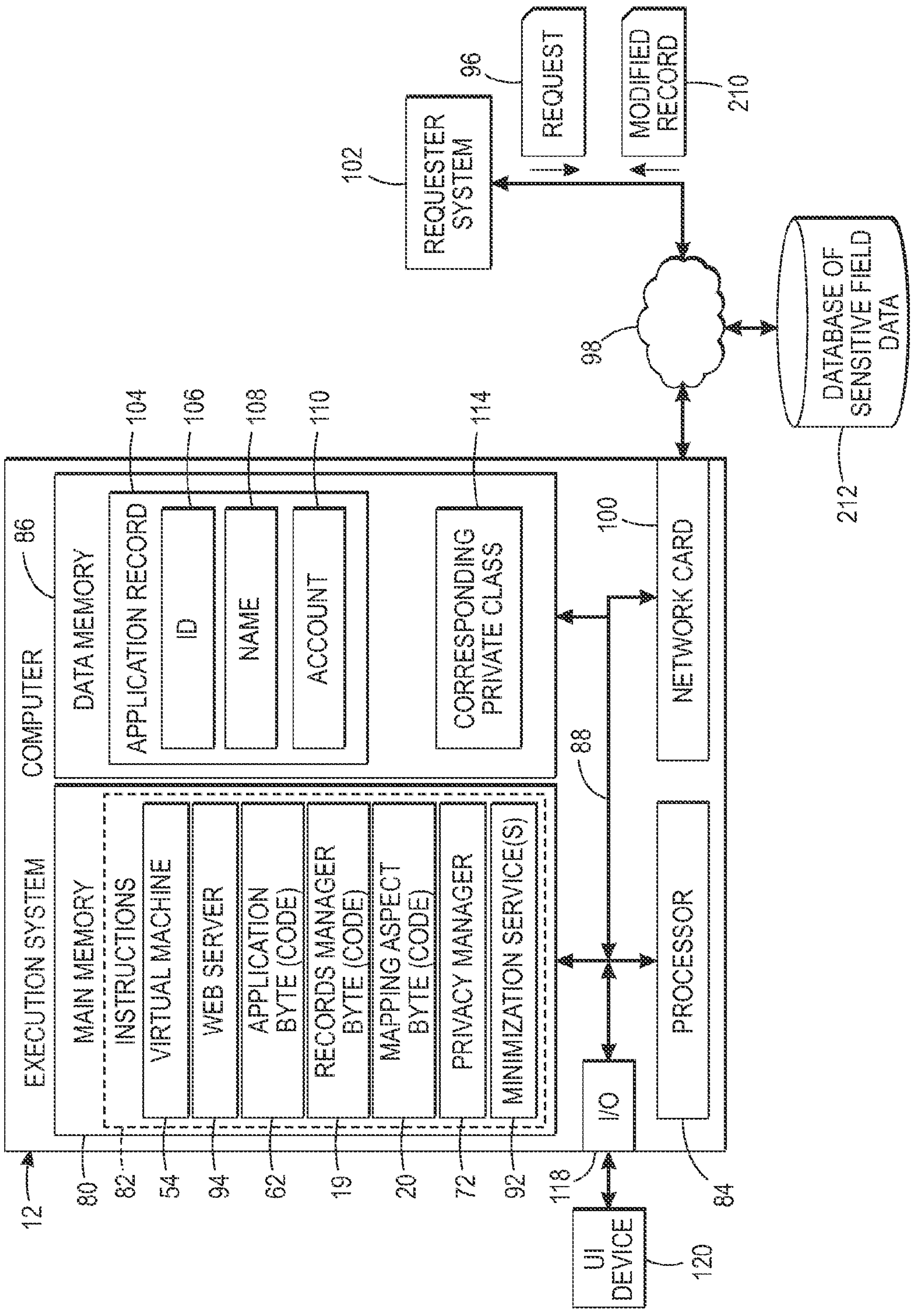
FIG. 2 is a functional block diagram of an execution system in accordance with another aspect of the exemplary embodiment.
Figure 3:
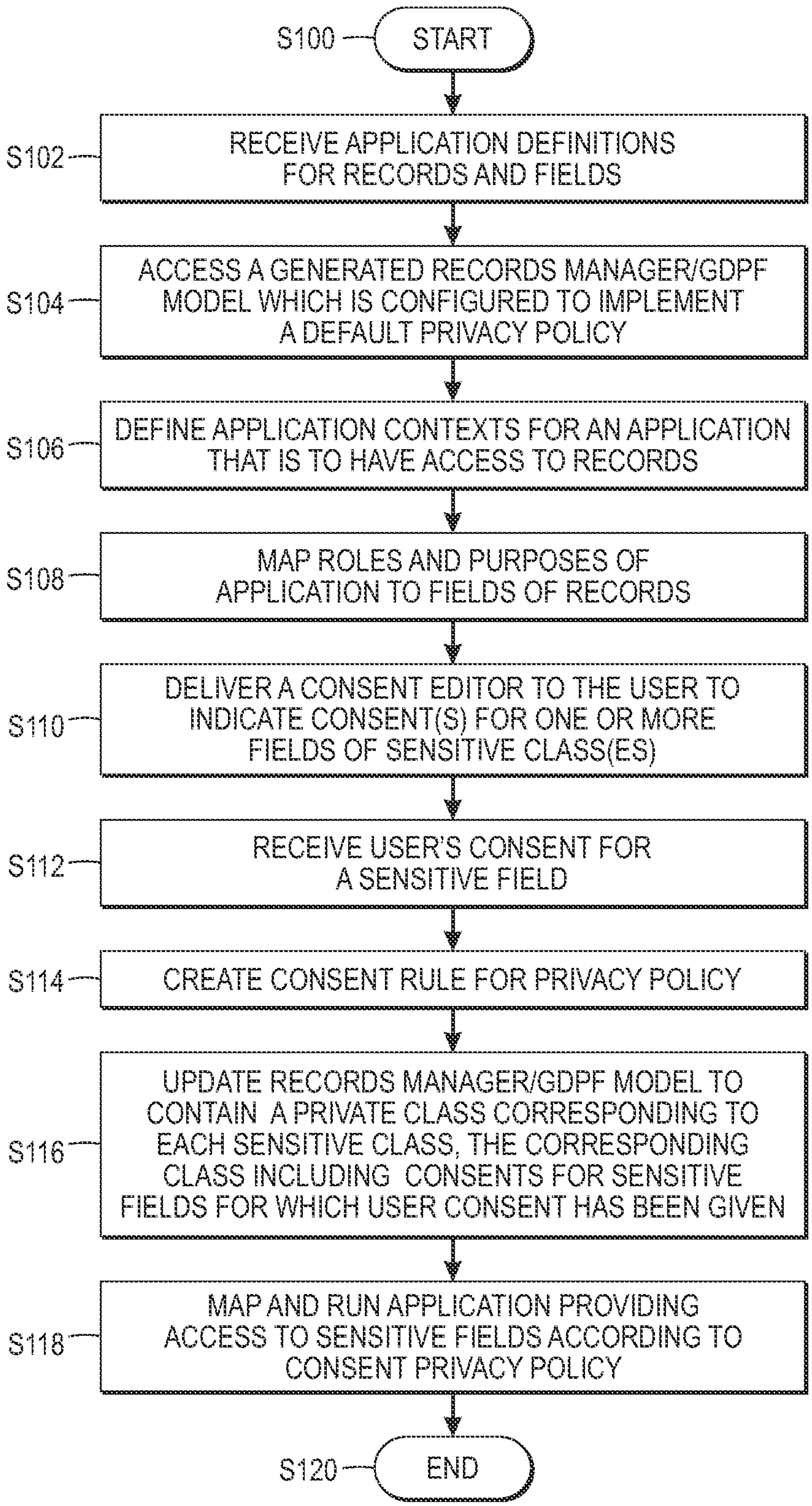
FIG. 3 is a flow chart illustrating a method of generating and running a privacy-by-consent enabled application.
Figure 4:
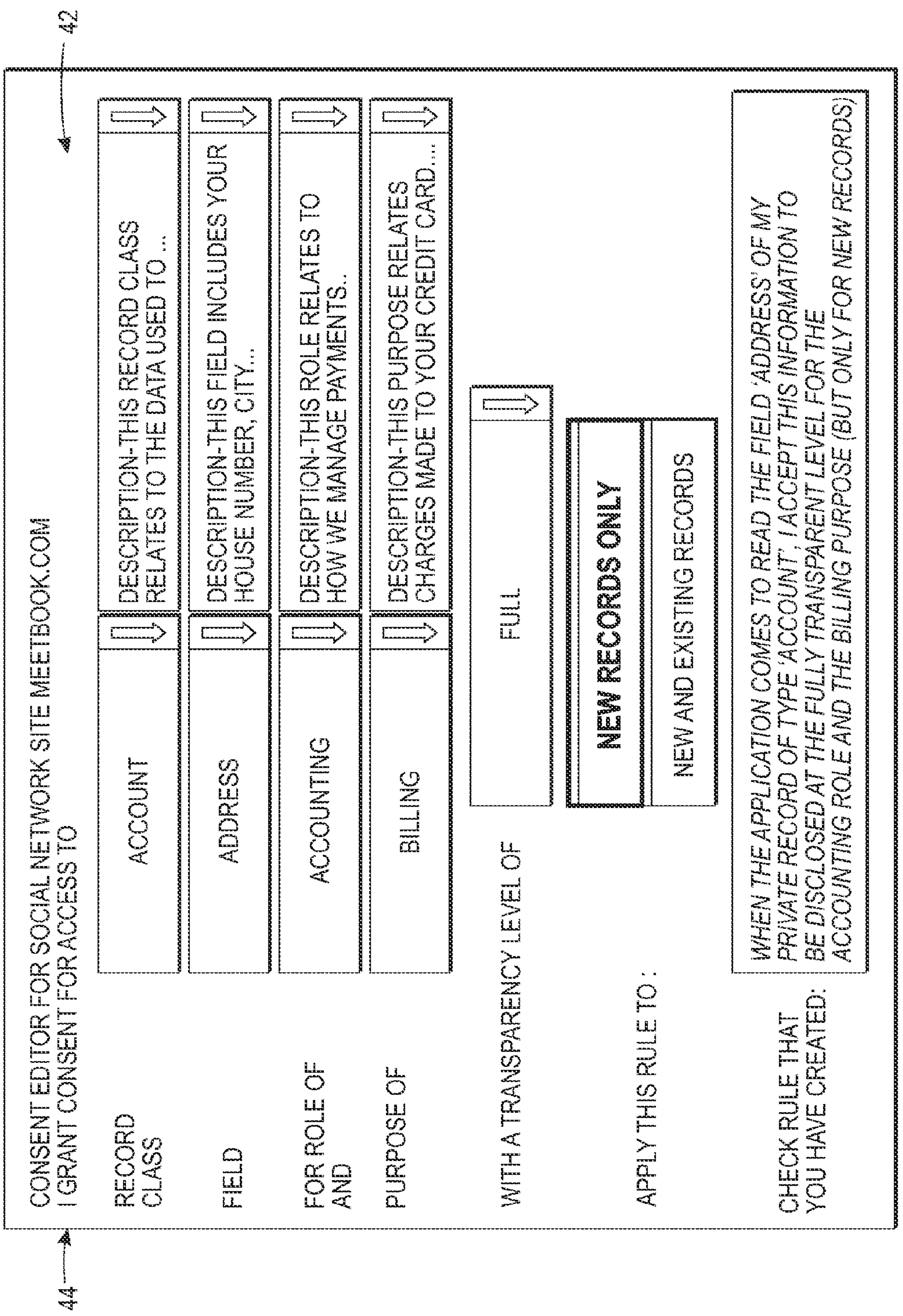
FIG. 4 is a screenshot of an example consent editor.

FIGS. 1 and 2 show functional block diagrams of computer-implemented specification and application execution systems 10, 12 suitable for performing the exemplary method disclosed with respect to FIG. 3. FIG. 1 shows a specification system 10 configured to interact with a user to enable the specify fields of a record for which the default privacy policy that has been set for those fields can be relaxed.

The system of FIG. 1 includes a records manager 14 and a mapping aspect 16, which control how the privacy policy is to be implemented in a given application, without the need for modifying the application prior to run-time. Each of these may include source code instructions 17, 18, which can be compiled to form records manager bytecode 19 and mapping aspect bytecode 20, respectively. FIG. 2 shows a system 12 for executing the application and the generated bytecode. While these are shown as separate systems, it is to be appreciated that they may be combined into a single system. Other computer systems may be configured and connected to provide other services, such as databases for persistent storage, web servers, and application logic servers to provide the logic for web servers.

With regard to FIG. 1, the specification system 10 includes a computer processing device (or "processor") 22 which controls the overall operation of the system 10 by execution of processing instructions 24 which are stored in an instruction memory 26 connected to processor 22 by a bus 28. The processor 22 also accesses data memory 30 through bus 28 to manipulate data contained in the data memory 30, such as the records manager and mapping aspect. Instruction memory (main memory) 26 stores instructions 24 for several software components. Specifically, a mapping component 32 maps sensitive fields to a respective application context (purposes and roles) for those fields in a given software application. A set of application definitions 36, which may be temporarily stored in memory 30, contains information on the records that are to be subject to the default privacy policy, which can be relaxed only by consent of the user. A user interface generator 34 generates a user interface to interact with a user. The user may interact with the computer system 10 via a user interface device 38 which connects to an input/output (I/O) unit 40 of the system 10 via a wired or wireless connection, such as the Internet 41. The user interface device 38 may provide user interface elements for the user, such as various screens, a dropdown menu, or the like. The user interface generator 34 provides the user with a consent editor 42 to specify the record classes and fields in order to relax the default privacy policy for at least one of the sensitive fields that are used by the application, but fewer than all at one time. In the exemplary embodiment, the editor does not provide simply for a blanket release for all fields designated sensitive in the default privacy policy, which helps to ensure that the consent is both explicit and informed. A consent enforcer 43 receives the user's consent and updates the default privacy policy (only for that user) to create a privacy-by-consent policy to reflect the current changes.

The UI device 38 may include a display device 44, such as an LCD screen or computer monitor, and an input device 46, such as a keyboard, keypad, touchscreen, cursor control device, or combination thereof. There may be multiple UI devices.

To facilitate the user's identification of the sensitive/not sensitive fields, the system may include a grammar 48 which allows a human operator who is familiar with the application to initially identify classes of records and/or fields of those records that are to be subject to the privacy policy, e.g., via a separate user interface device (not shown), prior to interaction with the user. The grammar may be written with a domain-specific language generator, such as Xtext. The exemplary grammar 48 is a textual grammar, referred to herein as 'gdpf' for Generic Digital Privacy Framework, expressed in a number of rules which identify fields that are likely to contain private data. From the sensitive fields identified by the operator, a model 50 may be generated, listing the sensitive fields and tracking the record classes which contain the sensitive fields. The model 50 is updated, by the consent enforcer 43, to specify the consent privacy policy applicable for a given user. Specifically, the model employs syntax to provide a means to define the application in terms of the application context (purposes and roles), and establish links with the enforcement framework.

Based on the updated model 50, a records manager generator 52 generates the source code 17 for a records manager (RM or RecordsManager) class using, a general-purpose programming language for a virtual machine 54 (FIG. 2), such as for example, Xtend in the case of a Java Virtual Machine. A mapping aspect generator 56 generates mapping aspect source code 18, e.g., also using Xtend. As will be appreciated, the same software component can serve as the records manager generator 52 and mapping aspect generator 56.

Once the records manager source code 17 and mapping aspect source code 18 have been generated, a compiler 58 (e.g., a Java programming compiler or Microsoft C# compiler) compiles each file to generate the records manager bytecode file 19, and the mapping aspect bytecode file 20. These files 19, 20 may be separate or combined. The code files are deployed with the original application code 62 to implement the consent privacy policy in the application without recompiling the original application. As will be appreciated, different software components can serve as the compiler for the records manager and mapping aspect or the compiler(s) may be combined into the generator(s) 52, 56.

In the method described herein, a distinction is made between source code, which refers to a human-readable (textual) representation of computer code, and bytecode, which is designed to be run on a virtual machine and is not human readable. As noted above, the code in files 19, 20, 62 may be bytecode, which may be bytecode for a virtual machine. That is, the bytecode is platform independent. The bytecode may then require further compiling to run on a specific application platform. In other embodiments, the application platform runs the bytecode without modification. Examples of bytecode include Java bytecode for running on a Java virtual machine and Common Intermediate Language (or Microsoft Intermediate Language) used in the NET framework. Both of these bytecodes may be further compiled before running an application or compiled just in time (JIT).

As part of an initial default privacy application, for example, the application definitions 36 may include an application record class 64 (the class may have a name such as "customer account"), which may include one or more fields 66, 68, 70. As an example, exemplary class 64 contains three fields: ID 66, name 68, and account reference 66. If the operator selects name 68 and account reference 66 as sensitive fields, the class 64 is considered as a sensitive records class. Other fields in the sensitive class which are not selected by the operator as being sensitive, such as ID 66, are need not be considered further (in the present case, the ID field is identified as the persistency key to be used by an external storage service to associate private clear values with the applicative records). The fields 66, 68, 70 are member variables of the class 64, but are referred to as fields because that term is commonly used when describing the variables at the bytecode level. The consent editor 42 provides the mapping between these fields for the user's records and the information displayed to the user which allows the user to specify the privacy level for the user's records, and thus modify the transparency of the data within the fields to the application using the data.

The code generator 52 generates the RM source code 17, which contains a class, called an RM class, containing a corresponding private record class for each application class 64 which has at least one sensitive field (member variable). Each sensitive field belongs to a class, and that class has a corresponding private class in the RM source code 17. The corresponding private class has a member variable of the type of the sensitive class allowing objects of the corresponding private class to track objects of the sensitive class (which may be thought of as the "legacy" or "original" class). While only one is shown, it is to be appreciated that there may be at least two or multiple sensitive application classes 64, each containing at least one sensitive field (or perhaps more), and therefore there will be multiple corresponding private classes, one for each application class. The mapping aspect source file 18 contains pointcuts at which the records manager 14 will augment the functioning of the application bytecode 62 to minimize or make transparent the data in the sensitive fields 66, 68, 70, depending on the received consent. Each pointcut is a set of one or more join points. When the application bytecode reaches one of the join points described in the pointcut, the piece of code associated with the pointcut is executed which causes the behavior of the sensitive field(s) of the application to be modified in such a way that they could disclose, under explicit consent verification at runtime, more information than the data they otherwise contain (i.e., the minimized value).

The generated source code may also contain code, not specific to the application, to cause a privacy manager 72 (see FIG. 2) to be loaded when the application is run. The privacy manager is a bootstrap class which loads configuration files, registers enforcement runner functions, and loads (or connects to) an existing minimization service. Enforcement runners are functions which, when a join is executed at a constructor or set function, look up which function is to be called for that class or field and call the function. They allow the join descriptions to be written generically and yet still call a particular function in a class of the records manager 14 by looking up the class that was constructed or field that was set in the join.

The system 10 may include a PC, such as a desktop, a laptop, palmtop computer, portable digital assistant (PDA), server computer, cellular telephone, pager, combination thereof, or other computing device or devices capable of executing instructions for performing the exemplary method or methods described herein.

The instruction memory 26 and data memory 30 may be separate or combined and may each represent any type of non-transitory computer readable medium, such as random access memory (RAM), read only memory (ROM), magnetic disk or tape, optical disk, flash memory, or holographic memory. In one embodiment, the memory 26, 30 comprises a combination of random access memory and read only memory. In some embodiments, the processor 22 and memory 26 and/or 30 may be combined in a single chip.

The I/O device 40 may include a network interface card that communicates with other devices via a computer network, such as a local area network (LAN), a wide area network (WAN), or the Internet, and may comprise a modulator/demodulator (MODEM). The digital processor 22 can be variously embodied, such as by a single core processor, a dual core processor (or more generally by a multiple core processor), a digital processor and cooperating math coprocessor, a digital controller, or the like.

With reference also to FIG. 2, the computer implemented execution system 12 includes main memory 80 which stores instructions 82 for performing the execution stage of the exemplary method and a processor 84 in communication with the main memory and with a data memory 86 for executing the instructions, all communicatively connected by a bus 88. Memory 80, processor 84, data memory 86 and bus 88 may be configured as for the corresponding hardware components of FIG. 1, except as noted. Elements that are also shown in FIG. 1 are accorded the same numerals.

The execution system 12 is configured to perform the second stage of the method that includes running the application bytecode 62 with the RM bytecode 19 and the mapping aspect bytecode 20. The bytecode files 19, 20, 62 may be run using the virtual machine 54 which either compiles the bytecode files to form native code (platform specific code) ahead of time or translates the code to native code as it is run (JIT). When the bytecode files 19, 20, 62 are loaded, they cause the privacy manager object 72 to be instantiated. This object is the bootstrap class which loads a gdpf configuration file, instantiates the record manager class, and either locates or instantiates a selected minimization service 92.

The system 12 may include, for example, a web server 94 which receives requests 96 over a network 98 via a network interface, such as a network interface card 100. The requests 96 may be generated by a remote requester system 102, i.e., a system which seeks to have the private data in its records maintained private when information from the records is used, released or otherwise processed in a manner which could otherwise cause the privacy of the data to be compromised. The requests from the requester system 102 may include a record to be processed with one or more fields including private data. For example, an operator of the requester system 102 may interact with the web server 94 which in turn calls the application bytecode 62 to create a new account which creates a new variable of the class application record 104, including populating fields (member variables of instance of class application record 104) such as ID 106, name 108, and account ID 100. Assuming that in the specification stage, the member variables name 108 and account ID 110 were designated as sensitive by default and/or by a user, then, when the application invokes either a constructor for the sensitive class application record 104 or sets one of the sensitive fields 108, 110, the pointcut in the mapping aspect bytecode 20 causes the records manager bytecode 19 to be invoked. This bytecode, using the method detailed with respect to FIG. 3, calls on the minimization service 92 to retrieve a corresponding private class 114 which computes or retrieves the values to be used as minimized values for the sensitive fields 108, 110 in place of the current field values. As will be appreciated, each field (or a group of fields) may be associated with a dedicated minimization service 92. Additionally, the system 12, rather than including the minimization service(s) may include a minimization service manager which calls on the trusted minimization services for the respective fields.

As illustrated in FIG. 2, the output of the execution system 12 may be one or more modified application records 210 in which the sensitive data has been minimized, except where the user has consented to a relaxation of the default privacy policy for a specified application context. The original data, extracted from those sensitive fields, is maintained by the system, separate from the records from which it is extracted, e.g., in an associated database 212, from where the original data can be retrieved when needed (e.g., for specified actions authorized by the owner of the private data). This satisfies the needs for such service providers to delegate the storage of sensitive parts of persistent records to a different storage unit, while the legacy record itself is minimized.

The system 12 may include an input/output device 118 which communicatively connects the system with an associated user interface device 120, which can be configured analogously to UI device 38, and which may allow an operator to, for example, start and stop system 12.

The memory and processor may be configured as for the system of FIG. 1.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIGS. 1 and 2 are high level functional block diagrams of only a portion of the components which are incorporated into a computer system. Since the configuration and operation of programmable computers are well known, they will not be described further.

FIG. 3 depicts a computer implemented method (which runs on a computer processing device) which may be performed with the system of FIGS. 1 and 2. The method begins at S100 of FIG. 3.

At S102, application definitions 36 are received for an application that is to be run.

At S104, a previously-generated records manager 14 is accessed. The records manager includes rules for minimizing values of data in selected sensitive fields belonging to a private class according to a default privacy configuration. The sensitive fields can be automatically selected or operator selected, as described above, and a representation of the sensitive fields stored in a model 50.

The records manager has access to a model of the application contexts to be considered at field access time and which is adapted by querying a user to gain explicit consent for relaxing a default privacy policy.

At S106, application contexts (e.g., purposes and roles) for a given application are defined, e.g., identified by the service provider. A “purpose” broadly defines for what function the data in a field will be used. A “role” defines the specific context within that general purpose. Exemplary definitions for a purpose may include a name, a description, and a coverage. The name of the purpose helps the user to make a rational decision as to whether to allow a relaxing of the minimized sensitive field. Examples of names of purposes may include: identity management, expert finding, context awareness, contact management, network awareness, exchange, and the like. The description of the purpose is a functional feature provided by the application through the records manager. For example, the ‘identity management’ purpose description details a centralized or local nature, the backup mechanisms, and the administrative responsibilities associated with this purpose. The description, along with the name, helps the user make an informed decision when queried to relax a minimized sensitive field. The more precise the description is, the more clearly the user will understand the purpose, and the more likely the user is to tune the privacy policy. The aim is that user will then trust such a well described service and disclose more of his data for needed features of the application. The coverage describes the execution flows of the service at runtime. In the case of many active purposes at the access time, the enforcement grants the least transparent expansion associated with each of them. Since consent specifies the user trust for given purposes, there is no automatic association of this level of trust with other purposes simply for the reason that they are being processed jointly.

Roles are handled similarly to purposes, i.e., with a title, description and coverage. The roles describe how the data is used.

At S108, a model of the application contexts for each of the sensitive fields is created which is accessible to the context editor 42 for identifying a set of application contexts for a given user-selected field. In particular, the application contexts are mapped within an application code executing tree with the gdpf structure 50. The specific application context(s) for release of a sensitive field by a user is thereby defined within the model 50. The coverage of the purposes and roles for the sensitive fields in the private class are explicit according to the name and description of the purposes and roles. The mapping is localized within the code execution tree, the various branches handling functional purposes. The main entry point of the application often carries the functional purposes of the service. If no separation is encountered along with the execution tree, no expansion of the default privacy policy occurs when one single purpose is ignored by expansion rules. It is desirable to locate as precisely as possible the effective enforcement branches of the purposes. If any sensitive field access can be enforced within the context of a single active purpose, then the relaxing potential of default privacy is optimal. This depends to some degree on the precision of the application architecture. If, however, the application code does not clearly associate fields with purposes, then the service provider can define a number of purposes, but the resulting mapping of such a purpose set, overlapping all along the execution tree, will make it more difficult for users to relax the default privacy policy, since the lowest expansion granted over a huge set of active purposes will be applied. Roles are simpler to locate, since they generally correspond to the inspection of some session properties. They are named, described carefully and mapped to applicative properties.

At S110, a consent editor 42 is delivered to the user. The consent editor 42 may be part of the user interface and is based on the defined application contexts (roles and/or purposes) for the sensitive fields in the private class and privacy-by-default enforced records incorporated by the records manager. The consent editor 42 may include a generic privacy rules editor tailored to the specific records, and their purposes and roles, declared by the service provider. The consent editor can be presented to the user as a user consent specification tool in the user interface.

At S112, explicit user consent is received by the consent editor via the user interface. The user may consent to have specific sensitive fields being relaxed. The user may consent to a full relaxation of the sensitive field, where the field is no longer minimized at all, i.e., its data is fully accessible to the execution system, or to a partial relaxation, which may provide a less stringent minimization than the one specified in the default privacy policy. For example, an address sensitive field can be fully relaxed so that the service provider sees the user’s entire address, or the address can be partially relaxed where only the city or state of the address sensitive field is able to be seen by the service provider (application). This allows better control over the user’s information by the user.

The user is thus able to specify the level of benefit which is provided from the service, such as a level that is higher than what the default privacy policy provides. Through the interface, the user grants an explicit consent, and decides under which conditions of the roles and purposes that a sensitive field would otherwise have generated within the service may be expanded, and to what level of transparency (e.g., full transparency or partial). As the data subject of collected records, the user can explicitly decide which level of transparency he grants to a given data processor, depending on the active applicative context at the access time. The user can thus grant consent for each of the fields of the user’s own records which are to be disclosed to the service and to specify conditions on the consent. This group of expansion grants is referred to generally as “the consent”. In the exemplary embodiment, one user can only deploy a single consent at a time for a given service. Such a consent is also aimed at overriding the default service to use for Minimization/Expansion towards a certified or trusted service, fully independent of the service provider's set of services.

In the exemplary embodiment, the user edits the consent via a controlled textual language. The user of the service may redefine the default privacy policy for each personal record exposed in the 'gdpf' description 50 of the service. For example, specific fields in the expanded gdpf description describe the levels of consent. Some or all of the following may be specified by the user as part of the consent:

1. A resilience delay that defines the delay after which a created record (or at least the sensitive fields) can no longer be accessed and should disappear from the storage system. This corresponds more or less to a leasing mechanism associated with any private record at its creation time. By updating the lease value of a deployed consent, the user may update the lease associated with the user at creation time, and so force the right to be forgotten with a null delay value.

2. A minimization or expansion remote service to be used, which overrides the existing service used by the implemented default privacy policy. The user-selected minimization service can thus provide a higher level of transparency for the user's data than the default minimization service specified for that particular field by the default privacy policy.

3. Under which applicative context (roles, purposes) the user grants access to any record from now on in the server application, including (a) for which set of fields and (b) an option to redirect this particular set of fields to another Minimization/Expansion service for the distribution. An example rule generated through the consent editor could be "the 'address' field of my personal record is visible for the role 'employer' for the 'find expert' purpose in a 'partially relaxed (fuzzy)' way. The fuzzy way means that the city is visible but not the street for example. This is defined and implemented by the Minimization service targeted for the particular 'address' field, which is also defined in the consent. The user thus grants access to any record created from now on in the server application for this set of fields.

4. A particular minimization service and its precise location (e.g., web address) to use with a given sensitive field.

5. Delegation of an access decision to a specific decision service managing the consents remotely from the service itself. The remote decision service distinguishes the server responsible for the context capture but not for the decision access sensitive fields. The contexts applied are the set purposes and roles of the sensitive field.

At S114, a consent rule is generated for each sensitive field relaxed in the consent, based on the user's selections. This rule is configured to be implemented by the minimization service targeted for the particular sensitive field defined in the consent (either by the user or otherwise by default) and authorizes the minimization service to expand the minimized data to the level of transparency specified and under the conditions set in the consent rule.

At S116, the records manager/gdpf model is updated to reflect the consent rules which have been created by the user. The records manager may thus contain a private class corresponding to each sensitive class, the corresponding class including consents for sensitive fields for which user consent has been given. An effective privacy policy is thus derived for the user based on the rules and consent incorporated by the records manager. The effective privacy policy is user specific, with the consent interpreted by the service once deployed. The user can, at any time, change their consent so that new collected data follows the consent privacy policy implemented when the new consent is created. Further, a user can decide to migrate one or more previously created records to his new deployed consent privacy policy, and/or specify a list of old consent privacy policies to be replaced, such that it is possible to manage old data with new rules of privacy expansion.

At S118, in the enforcement stage, the application is run. By default, each sensitive field is minimized on any 'setField (value)' operation, whatever the application purpose, thus, the application does not have access to the original data in the sensitive fields unless and until a specific consent is identified. The privacy-by-consent policy is implemented by the privacy manager 72, which causes the data in the sensitive fields that the user has consented to being accessible to the application being made transparent or partially transparent, but only for the application context(s) that the user has specified. The privacy manager is able to configure the consent configuration for each of the managed users. In the absence of a specific consent rule having been created for a particular sensitive field for one of the managed users, the default privacy policy is applied to that field when the application code calls for the data from that field, and the default minimization service is called to minimize the data.

Specifically, on each call to a 'getField( )' operation for a sensitive field, the privacy manager calls on the minimization service which originally minimized the data to expand the minimized data in the sensitive field, but only under the conditions specified above-the purpose of the getField access is known, it can be mapped to a specific owner's consent for the record and field; the consent grants a greater visibility to the data than the default one, for the specific context in which it is to be used; and the minimization service that applied the privacy-by-default in the past is accessible to serve as an expansion service to expand the minimized data.

The values to be used as minimized values for the sensitive fields 108, 110 are computed or retrieved by the minimization service and used in place of the current field values to create a modified record 210. As will be appreciated, each field (or a group of fields) may be associated with a dedicated minimization service 92. Additionally, the system 12, rather than including the minimization service(s) may include a minimization service manager which calls on the trusted minimization services for the respective fields. The original data from the fields may be stored in a database of sensitive field data 212, allowing it to be later accessed, e.g., should the user change the privacy policy.

When the application is run, several other objects, defined before, after, or in parallel with the method of FIG. 3, may also be instantiated, as discussed below.

The method ends at S120.

The method illustrated in FIG. 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the method for implementing a privacy policy.

Further details of the system and method will now be described.

As in the Ser. No. 14/141,548 application, an on-line service, managed through a default privacy method enforces minimization for sensitive fields of personal records. This means that the initial setting of a private value, collected through the service client connection, delegates the storage of this transparent value to a third-party minimization service, which returns a minimized value to the application. In the default privacy method, considering the data lifecycle, the application will manipulate a minimized field value and, by default, will never access the legacy value. The present method provides service providers with the ability to offer to their users the ability to relax this very limitative usage of sensitive fields. The full or partial disclosure of such minimized sensitive field may be needed for certain services and for the full benefit of providers and users, as long as the user remains the one to decide. Considering a social network site as an example, users are thus in a position to disclose their private information for benefiting from the service.

The user consent editor tool 42 may be sent to the user at subscription time. The resulting set of rules for such a tool used by a given service user can be configured to comply with any regulations for consent, e.g. as specified by the EU regulation which requires an informed and explicit consent of the data subject to allow the data curator to process the collected private information for precise purposes.

An advantage of such a modeling approach through access rules, written by the user on top of the applicative information provided by the service owner, is that consent can be considered as a technical object: the configuration of access controls to be applied when accessing collected records for a given user.

The present method helps service providers to organize and design their own consent enforcement support. The method makes use of generic support of privacy enforcement concepts such as access control, minimization, and expansion of private record fields. The service provider's responsibility is to ensure that the bridge between this external support framework and the application itself follows the privacy policy. The exemplary system is able to translate any deployed user consent into an effective privacy policy for a given user.

Figure 5:
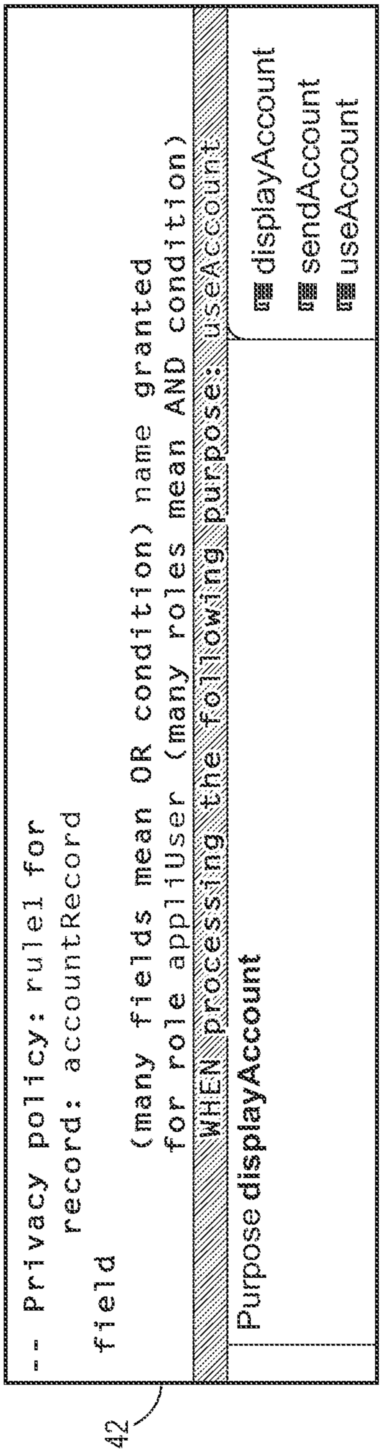
FIG. 5 illustrates example code for the consent editor.

FIG. 5 illustrates a screenshot of an exemplary consent editor 42 displayed on a user interface 44 which can be used to specify a rule such as "When the application comes to read the field 'address' of my private record of type 'Account', I accept this information to be disclosed at the fully transparent level for the 'accounting' role and the 'billing' purpose". This rule provides the ability for the service provider to use the address of its user if any billing is required. This statement can be automatically checked by the service prior to accepting any transaction with the user, relaxing the default privacy policy in a very particular situation. The rule may be generated by presenting a user with a set of options for selecting the role, from a set of two or more roles identified for the field, and the purpose, from a set of two or purposes identified for the field/role (where two or more roles/purposes exist) and to select a level of transparency from a set of two, three, or more transparency levels (where two or more transparency levels exist) and optionally, a new and/or existing records selection and/or a retention time for which the data is accessible.

As another example, a rule: "When it comes to the application to read the field 'address' of my personal record of type 'Account', I accept this information to be disclosed at a fuzzy level for the 'social' role and the 'introduction' purpose." The informed aspect of the consent comes from the description of records, purposes and roles manipulated by the service, while the explicit aspect of the consent is based on the application of the default privacy policy when no explicit rule has been provided to disclose a record field for a given applicative context.

The method can be implemented in the system of the Ser. No. 14/141,548 application as follows:

1. Extend the gdpf syntax in order not only to identify sensitive records and their respective sensitive fields, but also inform the user what are the purposes and roles handled by the application.

2. Create a consent language, and its associated constrained editor 42, which provide a user with the ability to policy rules based on the gdpf information provided by the service provider. An example of code for such an editor is shown in FIG. 5, where the generic consent definition syntax is validated and tailored to the specific records, roles and purposes identified by the service provider.

3. Support any user consent by applying it as an access control policy for the application. The support may be run as follows at runtime, when the application tries to read a sensitive field of a sensitive record through a record.getField code:

a) Apply the record mapping described in the Ser. No. 14/141,548 application. This mapping is responsible for generating a privacy-aware clone for the current record, which will be in charge of calling for the privacy support, provided the legacy record is referred to by the privateRecord being mapped. This private record may compute some privacy metadata such as the unique id, the consent version to consider, and the gdpf version to consider also. This function of mapping can be provided in the code of the application, or can be generated as a mapping aspect in some cases.

b) Obtain the user consent definition for the data subject of this record (the one who created the record). If there is no consent, the default privacy policy is applied, which means: do not expand the default (minimized) value, simply return this value. Otherwise, the consent is retrieved and an expansion decision is called for, given the active applicative context. An exemplary decision algorithm can be as shown in FIG. 6: If the response is REJECTED, the default privacy policy is applied. Otherwise, the granted level of transparency is retrieved from the decision response. The minimization service that minimized the field with the expansion query for the required transparency is called. The expansion will be done at the last level provided by the expansion capacities of the minimization service. If the consent stipulates a new minimization service, the algorithm calls for the migration of the field towards the new service. The algorithm logs, within the decision service and in the server, access decisions and consent related administrative actions for accountability.

Figure 7:
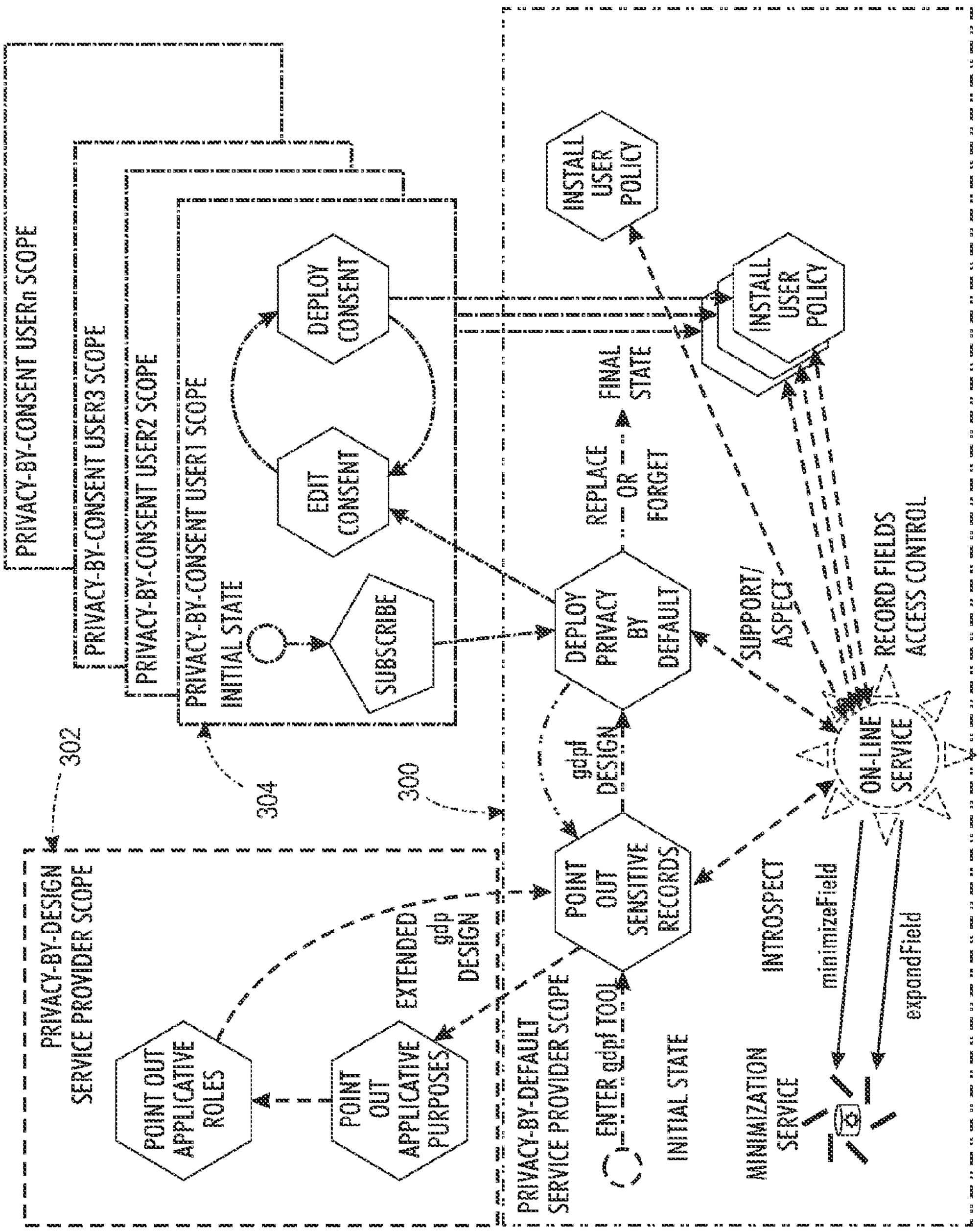
FIG. 7 illustrates the roles of the user and service provider in implementing a privacy policy.

FIG. 7 summarizes the action steps for the service provider and user to upgrade the default privacy policy to a consent privacy policy. In particular, the scope of the service provider's role is shown in box 300, which includes identifying the sensitive records and fields for a privacy by default policy to be run when an online service seeks access to the records. A designer's role is shown in box 302, which includes identifying the application context (roles and purposes) for the sensitive fields. The user's role is shown in box 304, with each user having a respective scope. When the user subscribes to the service, or subsequently thereafter, the user edits his consent and deploys it to the service provider, where it is installed for use when the online service calls for the user's data in the sensitive fields.

The gdpf specification 50 can be extended with defined roles and purposes with the gdpf grammar illustrated in FIG. 8. By mapping with such a language each purpose to a number of purpose points, the 'gdpf' designer is able to inform the future enforcement where in the execution flow a purpose is taken or released. In general, all the purposes are active when entering an application, since potentially all the functionalities can be reached. If only one of these purposes is not granted the access to a field, the minimized field will not be expanded.

The consent specification can be incorporated as follows. The consent language is imported into the 'gdpf' model provided by the service provider. The language can be a simple access rule language, for users to grant access to expansion functions for their own sensitive fields under explicit conditions of purpose and roles run by the application. The elicitation of roles, purposes and fields is performed in the imported 'gdpf' model, while the rules redaction can be provided by the final user for all the private records generated within the application. The user policy grammar rule (UserPolicy) can be as shown in FIG. 9. Here the references of type [gdpf: . . . ] are exploiting the objects defined in the imported gdpf model. The gdpf_base keyword in the syntax leads to classpath discovery of available 'gdpf' instances. The provided consent editor should ideally only contain the current 'gdpf' design proposed by the service provider. This means that when sending the rule editor to the service user, this editor simply needs to be uploaded with the 'gdpf' design of the application, so that this generic syntax can be specialized for a given set of records, fields, purposes and roles.

The validation of the consent, as well as the content assist function can be based on such imported definitions. Field candidates are thus predefined in the imported 'gdpf' and the same syntactic pre-definition can be used for roles and purposes.

The edited consent, when embedding the users relaxing expectations for given fields under certain conditions, will then be deployed on the server side, to be supported at runtime by the server application. This support tracks the application flow with respect to purpose points and role enablers, switching attached Roles and Purposes in active or inactive status, in order to communicate the applicative context at access time. It also attaches a new method to the Private Record embedding the applicative record, in order to override the default getField method with the following sequence within a Private Record Enforcement Runner associated to the record, with code which identifies the level of expansion and the minimization service to provide it, if needed. The application is able to deliver a context listing the current active roles and purposes, in conformity with the evaluation methods provided in the gdpf. Applying the rules related to the accessed field to the current context defines the transparency level granted by the consent. The default, when no rule releases the default privacy, will lead to returning the minimized value stored in the memory record without any expansion.

The privacy manager 72 has the responsibility for mapping each legacy record pointed out as sensitive to a clone object (privateObject), which will remain alive in memory during the session. The operation of record mapping may be redirected towards another specific mapper associated with the running user at object creation time. For persistent legacy records, this creator id is also stored, in order to map a reloaded user with the correct creating user. The mapping initializes the private record with a record enforcer, responsible for treating the getField and setField operations of the legacy record in conformity with the policies: the default privacy policy possibly overridden with a user policy derived from the rules expressed in the user consent. An enforcement runner is responsible for applying policies on sensitive fields of the legacy record. The setField operation asks for a minimization, while a getField operation requires an expansion, after checking with an appropriate decision service if such an expansion is granted.

The minimize function (called on the setField operation) and the expand function (possibly called, when expansion is granted) can be grouped together, in a single minimization/expansion service. This service can be remote or local, and can be interfaced through a serialized request, which may be encrypted for security reasons over the network. The service minimizes or expands the field and returns the value to consider within the legacy record within the response embedded in the request itself.

A decision service may be called only for the getField operation, prior to expanding a field value. The decision service initiates the request with an applicative context, providing the list of roles and purposes active at the access request time. The decider formats the request with the decision response: the access grant based on expansion rules, the transparency granted. If the expansion is granted, the same request will be pushed towards the expansion service, for the granted transparency level.

The enforcement runners and decision services may initialize themselves from the configuration resources available at runtime. The privacy manager may load in memory, the gdpf resources and user consents, in their native gdpf or consent syntaxes, and translate such persistent configuration resources into the appropriate services discovery constraints or decision rules for enforcement objects.

The minimization services support 92 can be similar or identical to the one in the gdpf description. To provide the ability for a final user to redirect the Minimization/Expansion functions towards his preferred service, the consent syntax may approximately duplicate the 'gdpf' syntax for services. The final user can then delegate, to its preferred service, the storage and minimization/expansion requests for each private rule. The user is responsible for naming the original service to be replaced, so that the discovery in the list of services can be based on the characteristics such as algorithm, name and transparency levels expected by the enforcement system.

Equipped with such a toolset and its associated support framework (implemented for its specific execution platform), a service provider is in a position not only to apply a default privacy policy, but also to extend it on demand with the explicit user consents. This ability is provided at a reasonable cost. This affordability offers a return to a nominal applicative set of functionalities that are otherwise lost by the application of the default privacy policy. This potential return to the applicative nominal conditions is achieved under the control and decision of the users themselves. Whenever the business value of the service is high enough, users will carefully manage and relax their privacy under specific conditions.

A principled framework is thus provided to allow service providers to collect user consents about usage of their private information. The service provider extends the application's usefulness in obtaining user's private data, while guaranteeing compliance with privacy preserving policies. The user is informed of the intended usages of the requested private data. The user consents to expanding sensitive fields containing private data. From the consents, a privacy rule for a particular application can be created and stored in a records manager to be implemented using a defined minimization service. The framework maps to an existing application providing low cost privacy by consent policy for the application.

EXAMPLE

A prototype implementation takes advantage of the following tools integrated within the eclipse environment: a) the XText technology, for the service architect to design within a specific text editor, the default privacy model, b) the XTend technology to generate all the mappings from the specific model towards the generic support implementation; and c) the AspectJ environment, in order to implement the records mapping without modifying the source application.

When editing a consent, a first step is to import the gdpf definition in the gdpf model 50 provided by the service provider. If this definition is not available, the editor 42 will not validate the consent. When the gdpf is imported, then the rules language will propose the records, fields, roles and purposes exposed in the gdpf model. Only textual fields were considered in the prototype implementation. The minimizers and expanders used were as follows: The returned minimized value is the 'opaque' string. When this value had been stored persistently on the minimizer service side, the returned value is 'persistOpaque'. At expansion time, the stored value is returned except for intermediate levels of transparency [Fuzzy, semiOpaque, veryFuzzy] where this level is appended with the transparent value. Typically, a minimized total textual value will be consulted as 'persistOpaque'. If the consent policy grants the full expansion of such a field in the consultation applicative context, the total value will be returned. If an intermediate level is granted, e.g. fuzzy, then the 'fuzzy total' value will be returned to the application.

A set of functional tests was developed to assess the feasibility of the enforcement support, based on resources edited with the syntax proposed. The default privacy policy is based on a very simple service, in charge of managing accounts.

On top of this default privacy policy, a first user user1 edited and deployed a consent privacy policy. The deployment in the test case was simply a manual operation of storage of two edited resources. The privacy resources were uploaded within the configuration managers. This convention, based on the availability of the resource through a classpath mechanism, simulates a part of the deployment automation, particularly by constraining the path of the resource with the internal name and the version declared within the resource itself. Based on such resources and legacy application, various tests were run:

Test 1 Loading gdpf model: checks the default privacy policy is loaded and is applied correctly.

Test 2 Loading User Privacy Model: checks the system is able to retrieve the user resources along the classpath convention, and is able to link the consent with the gdpf resource.

Test 3 Unallowed Access By Default: checks that in the case of no explicit consent rule, the default privacy minimization is applied on a sensitive field of a sensitive record, i.e., a fuzzy value is retrieved by the getField operation of a sensitive field value.

Test 4 Allowed Access checks that when a rule allows the applicative context to expand fully a sensitive field, the legacy field value is retrieved by the getField operation of the legacy application.

Test 5 Too Many Purposes checks that in case of an applicative context composed by multiple active purposes, if there is no rule granting an expansion for simply one of them, considering the active roles also, the default privacy will apply. This forces the application designer towards the separation of concerns during the design phase.

Test 6 Multi Roles Are Needed checks that if, by adding an active role granting the denied purpose in the previous test case, any active purposes are granted by the user policy, then the expansion will be applied. It also checks that the minimal granted level of transparency amongst the decision rules will be applied.

The set of tests was completed effectively in under 9 seconds.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for implementing a privacy policy, comprising:

for an application to be run, receiving definitions for a set of classes of record and for each of the record classes, a definition of at least one field, wherein at least one of the fields is designated as a sensitive field by a default privacy policy;

providing for a user to consent to relaxing the default privacy policy for at least one of the sensitive fields;

receiving a user's consent to relaxing the default privacy policy for at least one of the sensitive fields, with respect to the user's data in the respective sensitive field;

with a computing device including a processor, generating a consent privacy rule based on the received consent for the at least one of the sensitive fields; and providing a mapping aspect which is configured to be deployed when the application is run, the mapping aspect identifying joins at which code of the application is to be augmented to relax the default privacy policy for the user's data in a respective sensitive field for which a minimized value is generated under the default privacy policy, without recompiling the original application; and when the application is run, calling a minimization service to apply a level of transparency to the data in the at least one sensitive field, as authorized by the generated consent privacy rule, whereby the application does not have access to the user's data in the sensitive fields unless the user's consent for relaxing the default privacy policy for the field is identified.

2. The method of claim 1, wherein the providing for a user to consent comprises delivering a consent editor to the user to designate consents for the minimized sensitive field through a user interface.

3. The method of claim 2, wherein the consent editor provides for the user to select a sensitive field and to specify, for that sensitive field, at least one of:

an application context for which the default policy is to be relaxed, selected from a predefined set of application contexts;

a level at which the default policy is to be relaxed, selected from a predefined set of levels;

a minimization service to be used for generating a minimized value of data in the sensitive field; and a remote decision service which manages access to the field by the application.

4. The method of claim 3, further comprising storing a model of application contexts for each of the sensitive fields and wherein the consent editor accesses the model of application contexts to identify the set of application contexts for the user-selected field.

5. The method of claim 3, wherein the predefined set of levels includes at least one of:

a level in which the user's data is fully transparent; and a level at which the user's data is only partially transparent.

6. The method of claim 3, wherein the user-selected minimization service provides a higher level of transparency of the user's data than a default minimization service specified for the field by the default privacy policy.

7. The method of claim 3, wherein the consent editor further provides for the user to specify a resilience delay that defines the time after which a created record, or the sensitive fields thereof, can no longer be accessed.

8. The method of claim 1, further comprising providing a model in which the sensitive fields are modeled and updating the model based on the generated consent privacy rule.

9. The method of claim 1, further comprising deploying the mapping aspect when the application is run, whereby the privacy consent rule is applied when the application calls for access to the user's data in the respective sensitive field.

10. The method of claim 1, wherein the receiving consent to at least one of the fields comprises generating a user interface which enables the user to select to relax the default privacy policy of at least one of the sensitive fields defined in the application.

11. The method of claim 1, wherein a plurality of the fields are designated as sensitive by the default privacy policy and the receiving of the user's consent includes providing for receiving consent for each of the sensitive fields separately, whereby a user is able to consent to the default policy being relaxed for fewer than all of the sensitive fields.

12. The method of claim 1, further comprising mapping each of the sensitive fields used by the application to respective application contexts and wherein the consent editor provides for the user to specify, for a selected sensitive field an application context for which the default policy is to be relaxed, selected from the application contexts that have been mapped to that sensitive field.

13. The method of claim 1, wherein the application comprises bytecode which is executable by a virtual machine, the virtual machine being executed by a computer processing device.

14. The method of claim 1, wherein the mapping aspect includes a pointcut which identifies a join point for each sensitive field.

15. The method of claim 1, further comprising:

running the application including implementing the privacy-by-consent policy, which causes the data in each of the sensitive fields that the user has consented to being accessible to the application being made transparent or partially transparent only for application contexts that the user has specified, otherwise applying the default privacy policy to that field when the application code calls for the data from that field, and calling a default minimization service to minimize the data.

16. The method of claim 1, wherein the consent privacy rule is configured to be implemented by a minimization service targeted for the particular sensitive field defined in the consent and authorizes the minimization service to expand the minimized data to a level of transparency specified and under conditions set in the consent privacy rule.

17. A computer program product comprising hardware including non-transitory memory which stores instructions that when executed by a processor, perform a method for implementing a privacy policy, the method comprising:

for an application to be run, receiving definitions for a set of classes of record and for each of the record classes, a definition of at least one field, wherein at least one of the fields is designated as a sensitive field by a default privacy policy;

providing for a user to consent to relaxing the default privacy policy for at least one of the sensitive fields;

receiving a user's consent to relaxing the default privacy policy for at least one of the sensitive fields, with respect to the user's data in the respective sensitive field;

with a computing device including a processor, generating a consent privacy rule based on the received consent for the at least one of the sensitive fields;

providing a mapping aspect which is configured to be deployed when the application is run, the mapping aspect identifying joins at which code of the application is to be augmented to relax the default privacy policy for the user's data in a respective sensitive field for which a minimized value is generated under the default privacy policy, without recompiling the original application; and when the application is run, calling a minimization service to apply a level of transparency to the user's data in the at least one sensitive field, as authorized by the generated consent privacy rule, whereby the application does not have access to the user's data in the sensitive fields unless the user's consent for relaxing the default privacy policy for the field is identified.

18. A system for implementing a privacy policy, comprising:

memory, including hardware, which receives definitions for a set of classes of records and for each of the record classes, a definition of at least one field, wherein at least one of the fields is designated as a sensitive field by a default privacy policy;

a user interface generator which provides a consent editor to a user for the user to consent to relaxing the default privacy policy, with respect to the user's data, for at least one of the sensitive fields;

a mapping aspect which is configured to be deployed when the application is run, the mapping aspect identifying joins at which code of the application is to be augmented;

a privacy manager which, when the application is run, calls an associated minimization service to apply the default privacy policy by generating a minimized value of data in each of the designated sensitive fields used by the application in the absence of a user's consent which relaxes the default privacy policy for the user's data in one of the sensitive fields, whereby the application does not have access to the user's data in the sensitive fields unless the user's consent for relaxing the default privacy policy for the field is identified; and a processor, including hardware, which implements the user interface generator and mapping aspect.

19. The system of claim 18, further comprising a records manager generator which generates a records manager that receives and stores user consents for sensitive fields.

20. The system of claim 18, further comprising a mapping component that locates sensitive fields in an application and identifies respective application contexts for each of the sensitive fields.

* * * * *